US012559093B2

(12) United States Patent
Bruno et al.

(10) Patent No.: US 12,559,093 B2
(45) Date of Patent: Feb. 24, 2026

(54) METHOD FOR ACTIVATING AN OBSTACLE AVOIDANCE SYSTEM FOR A MOTOR VEHICLE

(71) Applicants: RENAULT S.A.S., Boulogne Billancourt (FR); NISSAN MOTOR CO., LTD., Kanagawa-ku (JP)

(72) Inventors: Geoffrey Bruno, Issy les Moulineaux (FR); Clement Coste, Nimes (FR); Anh-Lam Do, Antony (FR); Henri Manuel Filipe, Paris (FR); Marouane Lehim, Chaville (FR); Khoa Duc Nguyen, Sartrouville (FR)

(73) Assignees: AMPERE S.A.S., Boulogne Billancourt (FR); NISSAN MOTOR CO., LTD., Kanagawa-ku (JP)

( * ) Notice: Subject to any disclaimer, the term of this patent is extended or adjusted under 35 U.S.C. 154(b) by 245 days.

(21) Appl. No.: 18/547,072

(22) PCT Filed: Jan. 26, 2022

(86) PCT No.: PCT/EP2022/051699
§ 371 (c)(1),
(2) Date: Aug. 18, 2023

(87) PCT Pub. No.: WO2022/175034
PCT Pub. Date: Aug. 25, 2022

(65) Prior Publication Data
US 2024/0317218 A1      Sep. 26, 2024

(30) Foreign Application Priority Data
Feb. 19, 2021    (FR) ..................................... 21 01652

(51) Int. Cl.
*B60W 30/09* (2012.01)
*B60W 40/107* (2012.01)

(52) U.S. Cl.
CPC .......... *B60W 30/09* (2013.01); *B60W 40/107* (2013.01); *B60W 2554/801* (2020.02); *B60W 2554/803* (2020.02)

(58) Field of Classification Search
CPC ............... B60W 30/09; B60W 40/107; B60W 2554/801; B60W 2554/803;
(Continued)

(56) References Cited

U.S. PATENT DOCUMENTS 7,230,524 B2 * 6/2007 Watanabe ............. G01S 13/931
                                                      348/148
9,352,778 B2 * 5/2016 Yoon .................... B62D 15/025
(Continued)

OTHER PUBLICATIONS

Schlechtriemen, Julian, Kim Peter Wabersich, and Klaus-Dieter Kuhnert. "Wiggling through complex traffic: Planning trajectories constrained by predictions." 2016 IEEE Intelligent Vehicles Symposium (IV). IEEE, 2016. (Year: 2016).*
(Continued)

*Primary Examiner* — Russell Frejd
*Assistant Examiner* — Ana D Thomas
(74) *Attorney, Agent, or Firm* — Oblon, McClelland, Maier & Neustadt, L.L.P.

(57) ABSTRACT

A method triggers an obstacle avoidance system. The method includes detecting at least one object forming a potential obstacle, determining the time remaining until the motor vehicle strikes the object, determining a path deviation to be performed to avoid the object, and activating the avoidance system according to the values of the parameter and each path deviation. The determination step includes calculating the difference between the lateral speed of the motor vehicle relative to the road in a reference frame oriented in accordance with the road at the motor vehicle, and the lateral speed of the object relative to the road in a
(Continued)

reference frame oriented in accordance with the road at the object, and determining each path deviation according to the difference.

9 Claims, 4 Drawing Sheets

(58) Field of Classification Search
CPC ....... B60W 2420/408; B60W 2552/00; B60W 2552/30; B60W 2552/53; B60W 2554/80; B60W 30/08; B60W 30/095; B60Y 2300/09; B60Y 2300/095
See application file for complete search history.

(56) References Cited

U.S. PATENT DOCUMENTS

| | | | | |
|---|---|---|---|---|
| 12,320,892 | B2 * | 6/2025 | Fujiwara | G01S 15/42 |
| 2010/0228468 | A1 * | 9/2010 | D'Angelo | G08G 5/25 |
| | | | | 701/120 |
| 2016/0264136 | A1 * | 9/2016 | Minoiu Enache | B60W 30/095 |
| 2019/0220021 | A1 * | 7/2019 | Yasui | G01C 21/14 |
| 2019/0291728 | A1 * | 9/2019 | Shalev-Shwartz | B60W 40/06 |
| 2020/0391745 | A1 * | 12/2020 | Mori | G06V 10/50 |
| 2021/0053560 | A1 * | 2/2021 | Haddad | B60W 30/08 |
| 2021/0173093 | A1 * | 6/2021 | Redler | G01S 19/36 |
| 2021/0239474 | A1 * | 8/2021 | Tsuruoka | G01C 21/3407 |
| 2021/0354686 | A1 * | 11/2021 | Pan | G01S 15/08 |
| 2021/0362741 | A1 * | 11/2021 | Han | G01C 21/3815 |
| 2022/0089219 | A1 * | 3/2022 | Takebayashi | B62D 15/025 |
| 2023/0322208 | A1 * | 10/2023 | Rojas | B60W 50/085 |
| | | | | 701/41 |

OTHER PUBLICATIONS

International Search Report issued May 11, 2022 in PCT/EP2022/051699, filed on Jan. 26, 2022, 2 pages.

French Preliminary Search Report issued Nov. 9, 2021 in FR application 21 01652, filed on Feb. 19, 2021, 8 pages (with English Translation of Categories of Cited Documents & Written Opinion).

Lienke et al. "Predictive Driving: Fusing Prediction and Planning for Automated Highway Driving", IEEE Transactions on Intelligent Vehicles, vol. 4, No. 3. Sep. 2019, 12 Pages.

Kim et al. "Curvilinear-Coordinate-Based Object and Situation Assessment for Highly Automated Vehicles", IEEE Transactions on Intelligent Transportation Systems, vol. 16, No., 3, Jun. 2015, 17 pages.

Weiskircher et al. "Frameworks for Interfacing Trajectory Tracking with Predictive Trajectory Guidance for Autonomous Road Vehicles", 2015 American Control Conference (ACC), Jul. 2015, 6 pages.

* cited by examiner

METHOD FOR ACTIVATING AN OBSTACLE AVOIDANCE SYSTEM FOR A MOTOR VEHICLE

TECHNICAL FIELD OF THE INVENTION

The present invention relates generally to the detection and the avoidance of obstacles by a motor vehicle.

It is particularly advantageously applicable in the context of aids to the driving of motor vehicles.

It relates more particularly to a method for triggering an obstacle avoidance system for a motor vehicle running on a road, comprising steps of:

detecting at least one object situated in the environment of the motor vehicle and acquiring data relating to each detected object, determining, for said at least one object, a parameter relating to the time remaining before the motor vehicle can strike said object, as a function of the acquired data, determining at least one path deviation to be performed to avoid said at least one object, and activating the obstacle avoidance system to avoid said at least one object as a function of the values of said parameter and of each path deviation associated with said at least one object.

The invention relates also to a motor vehicle equipped with a computer suitable for implementing this method.

STATE OF THE ART

In the interests of making motor vehicles safe, the latter are currently equipped with driving assistance systems or autonomous driving systems.

Among these systems, those that are notably known are the automatic emergency braking systems (better known by the abbreviation AEB), that are designed to avoid any collision with obstacles situated in the lane taken by the vehicle, by acting simply on the conventional braking system of the motor vehicle.

There are however situations in which these emergency braking systems do not make it possible to avoid the collision or cannot be used (for example if another vehicle is following too close behind the motor vehicle).

For these situations, automatic avoidance systems (better known by the abbreviation AES, which stands for "advanced evasive steering" or "automatic emergency steering") have been developed which make it possible to avoid the obstacle by diverting the vehicle from its path, by acting on the steering of the vehicle.

For this AES function to be effective, it needs to reliably detect that part of the environment of the motor vehicle which is relevant for the calculation of an optimal avoidance path.

More specifically, in an environment perceived by the sensors of the vehicle, it is essential to perform a sorting of the information to judge the relevance, within the meaning of the AES function, of the detected elements.

One parameter that is generally used to this end is called time to collision (TTC).

A second parameter is formed by the deviation to be performed to pass to the side of the detected object without striking it.

The assessing of these parameters is generally done by using simplifying hypotheses (for example by making the assumption that the obstacle is moving in a straight line), which results in poor detections and therefore untimely triggerings of the AES function.

SUMMARY OF THE INVENTION

In order to remedy this drawback, the present invention proposes a method such as that defined in the introduction, wherein the step of determining the lateral deviation comprises:

calculating a relative lateral speed as a function of the deviation between, on the one hand, the lateral speed of the motor vehicle with respect to the road in a reference frame oriented according to a tangent to the road at the motor vehicle, and, on the other hand, the lateral speed of the object with respect to the road in a reference frame oriented according to a tangent to the road at said object, and determining each path deviation as a function of the relative lateral speed.

The relative lateral speed is, here, defined as a function of a deviation between two terms. It is in practice a relative lateral speed component between the motor vehicle and an object, relative to the road taken. The expression "relative to the road taken" means that the two terms are calculated in two distinct reference frames.

Thus, by virtue of the invention, the determining of the lateral deviation is performed by taking account of the curvature of the road, of the direction of advance of the vehicle and of the direction of advance of the detected object. It is indeed understood that if the road is very curved and the motor vehicle and the detected object follow the curvature of the road on distinct traffic lanes, the calculated lateral deviation will be significant even though, at a given instance, the object will be located in the axis of the motor vehicle.

The invention therefore makes it possible to avoid false detections of hazardous situations. It also makes it possible to detect very much in advance situations that are truly hazardous.

Other advantageous and nonlimiting features of the method in accordance with the invention, taken individually or according to all technically possible combinations, are as follows:

said path deviation is determined as a function also of said parameter and/or as a function of an angle formed between the speed vector of the object and the tangent to the road at said object;

the step of determining said parameter comprises calculating an arc distance between the motor vehicle and said object, calculating a relative longitudinal speed as a function of the deviation between, on the one hand, the longitudinal speed of the motor vehicle with respect to the road in the first reference frame, and, on the other hand, the longitudinal speed of the object with respect to the road in the second reference frame, calculating a relative longitudinal acceleration as a function of the deviation between, on the one hand, the longitudinal acceleration of the motor vehicle with respect to the road in the first reference frame, and, on the other hand, the longitudinal acceleration of the object with respect to the road in the second reference frame, and determining said parameter as a function of the relative longitudinal speed, of the relative longitudinal acceleration and of the arc distance;

a step is provided for calculating a maneuvering time necessary to avoid said object as a function of said path deviation and in which the activation of the obstacle avoidance system is performed according to said maneuvering time;

a step is provided for calculating a critical time relative to the time remaining to avoid said object in total safety, as a function of the maneuvering time and of said parameter, and in which the activation of the obstacle avoidance system is performed according to said critical time;

to activate the obstacle avoidance system such that it performs the avoidance without intervention from the driver of the motor vehicle when several objects have been detected, provision is made to calculate, for each object, a critical time to avoid said object by the left and a critical time to avoid said object by the right, to select, for each object, the greater of the two calculated critical times, then to elect the lowest critical time from among the selected critical times, the activation of the avoidance system being performed according to said elected critical time;

to activate the obstacle avoidance system such that it performs the avoidance given action from the driver of the motor vehicle on the steering wheel when several objects have been detected, provision is made to calculate, for each object, a critical time to avoid said object by the left and a critical time to avoid said object by the right, select the smallest of the calculated critical times to perform an avoidance by the left, select the smallest of the calculated critical times to perform an avoidance by the right, the activation of the avoidance system being performed as a function of the moment at which the driver of the motor vehicle initiates an avoidance and as a function of one of the two selected critical times, namely that which is associated with an avoidance by the side to which the driver of the motor vehicle initiates an avoidance;

a step is provided for filtering detected objects during which a distance is determined between each object and a lane separation line, the objects for which the lateral relative speed is greater than a threshold deduced from said distance are selected, the step of calculating the critical time being implemented only for the selected objects;

a step is provided for filtering detected objects during which the positions of the objects are determined with respect to traffic lanes of the road, the objects situated on the traffic lanes of the road and for which the parameter is less than a predetermined threshold are selected, the step of calculating the critical time being implemented only for the selected objects;

to determine the distance between each object and a lane separation line, a looped recursive process is used which involves meshing the lane separation line over an interval that is increasingly shorter on each loop, calculating a distance between the object each mesh of the lane separation line, determining the mesh closest to the object and recentering the interval around this mesh.

The invention relates also to a motor vehicle comprising at least one drive wheel, a steering system for each drive wheel suitable for being maneuvered by an actuator controlled by a computer, which computer is suitable for implementing a triggering method as cited above.

Obviously, the different feature, variants and embodiments of the invention can be associated with one another according to various combinations in as much as they are not incompatible or mutually exclusive.

DETAILED DESCRIPTION OF THE INVENTION

The description which follows in light of the attached drawings, given as nonlimiting examples, will give a good understanding as to what the invention consists of and how it can be produced.

Figure 1:
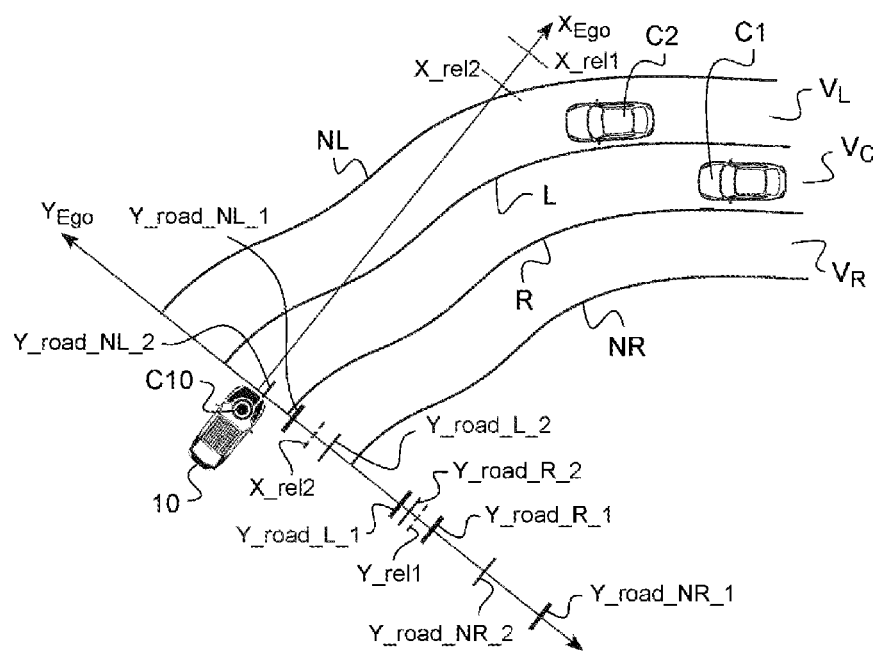
FIG. 1 is a schematic view of a motor vehicle according to the invention and of two target cars traveling on two distinct traffic lanes.

FIG. 1 represents a motor vehicle 10 running on a road on which there are two "objects" forming potential obstacles for the motor vehicle 10. Here, these two objects are formed by cars C1, C2. As a variant, they could be other types of objects (pedestrians, cyclists, etc.). The objects considered are preferably moving.

Hereinafter in the description, the motor vehicle 10 is that which will implement the present invention, and it will be called "EGO vehicle 10".

This EGO vehicle 10 conventionally comprises a chassis which delimits a vehicle interior, wheels of which at least two are drive wheels, a power train, a braking system and a conventional steering system that makes it possible to act on the orientation of the drive wheels.

In the example considered, the steering system is controlled by an assisted steering actuator which makes it possible to act on the orientation of the drive wheels as a function of the orientation of the steering wheel and/or, depending on the cases, as a function of a setpoint issued by a computer C10.

The computer C10 comprises at least one processor, at least one memory and different input and output interfaces.

By virtue of its input interfaces, the computer C10 is able to receive input signals originating from different sensors.

Such sensors that are for example provided include:

a device such as a front-mounted camera, making it possible to register the position of the EGO vehicle with respect to its traffic lane, a device such as a RADAR or LIDAR remote detector, making it possible to detect an obstacle located on the path of the EGO vehicle 10, at least one lateral device such as a RADAR or LIDAR remote detector, making it possible to observe the environment on the sides of the EGO vehicle.

The computer C10 thus receives from several sensors data relating to the objects present in the environment of the EGO vehicle 10. Conventionally, the data are combined together so as to provide reliable merged data on each object.

By virtue of its output interfaces, the computer C10 is suitable for transmitting a setpoint to the assisted steering actuator.

It thus makes it possible to ensure that the vehicle best follows, if the driving conditions justify it, an obstacle avoidance path.

By virtue of its memory, the computer C10 stores data used in the context of the method described below.

It stores notably a computer application, composed of computer programs comprising instructions whose execution by the processor makes it possible for the computer to implement the method described hereinbelow.

These programs notably comprise an "AES system" which is designed to calculate an obstacle avoidance trajectory and to control the EGO vehicle 10 in such a way that it follows this path or to assist the driver in controlling the EGO vehicle 10 in such a way that it follows this path. The AES system has an autonomous mode in which the path is followed without the assistance of the driver, and a manual mode in which the AES system assists the driver in avoiding the obstacle and in which the driver remains the master of the maneuver. Since this AES system is well known to the person skilled in the art, it will not be described here in detail.

The computer programs also comprise AES system activation software, which will make it possible to determine whether the AES system must be activated (given the path of the EGO vehicle and those of the objects present in its environment) and wait for the best moment to activate it. It is this activation software which here more specifically forms the subject matter of the present invention.

This software is active as soon as the EGO vehicle 10 is in motion.

It is implemented in loop form, at regular time steps.

It comprises a preliminary step of acquisition of data relating to the EGO vehicle 10 and to its environment, followed by nine main steps. These successive steps can then be described one by one.

During the preliminary step, the computer C10 receives at least one image acquired by the front-mounted camera of the EGO vehicle 10. It also receives data from the remote detectors. These images and data are then merged.

At this stage, the computer C10 therefore has an image of the road situated in front of the EGO vehicle 10 and merged data which notably characterize each object detected and situated in the environment of the EGO vehicle 10. This environment is, here, considered to be the zone situated around the EGO vehicle, in which the sensors of the vehicle are designed to acquire data.

In the example of FIG. 1, the EGO vehicle is running on a central traffic lane $V_C$, on either side of which there are two other traffic lanes $V_R$, $V_L$.

The computer C10 then seeks to determine the positions and forms of the separation lines NL, L, R, NR of these traffic lanes $V_C$, $V_R$, $V_L$.

For that, here, each of these lines is modeled by an equation of polynomial form. Here, the chosen polynomial is of third order, so that it is possible to write:

$$yLine = d.x^3 + c.x^2 + b.x + a \qquad \text{[Math. 1]}$$

In this equation:
the term yLine represents the lateral coordinate of the lane separation line considered, the term x represents the longitudinal coordinate of this line, and the terms a, b, c and d are coefficients of the polynomial, determined as a function of the form of the line seen by the front-mounted camera of the EGO vehicle (or acquired by the computer C10 in a navigation system comprising a detailed mapping of the places in which the EGO vehicle is moving).

In practice, these terms are supplied by the merging of data. They make it possible to model the form of the lane separation lines up to a distance of approximately 100 or so meters when visibility conditions are good.

At this stage, it will be noted that, hereinafter in this explanation, a term qualified as "longitudinal" will correspond to the component of a vector on the abscissa of the reference frame considered, and a term qualified as "lateral" will correspond to the component of a vector according to the ordinate of the reference frame considered (the reference frames here considered being always orthonormal).

The equation [Math. 1] is expressed here in a reference frame $(X_{EGO}, y_{EGO})$ attached to the EGO vehicle 10 and represented in FIG. 1. This reference frame is oriented in such a way that its abscissa axis extends on the longitudinal axis of the EGO vehicle 10. It is centered at the front RADAR of the EGO vehicle 10.

As a variant, other, simpler or more complex modelings of the geometries of the lane separation lines could be used.

Once the coefficients a, b, c, d have been determined for each lane separation line, the computer C10 can implement the nine steps of the method which will make it possible to perceive the extent to which the detected objects are hazardous for the EGO vehicle in order to trigger, if necessary, the obstacle avoidance system AES.

The first step consists in determining the distance which separates the EGO vehicle from the object considered (one of the cars C1, C2).

The distance calculated here is not a Euclidian distance. Indeed, the aim is to take account of the form of the road to determine a distance that the EGO vehicle 10 and the object would have to travel before striking each other.

The computer C10 therefore here calculates an arc distance $L_{AB}$.

For that, as for example detailed in the document FR3077547, the computer can use the following equation:

$$L_{AB} = \int_{x_A}^{x_B} \sqrt{1 + \frac{d(Yline)^2}{dx}} \, dx \qquad \text{[Math. 2]}$$

In which:
$L_{AB}$ is the distance of an arc between two points A and B (corresponding to the positions of the EGO vehicle and the object considered), $x_A$ is the longitudinal position of the EGO vehicle (at the RADAR), and $x_B$ is the longitudinal position of the object considered, in the reference frame $(X_{EGO}, Y_{EGO})$.

The second step consists in determining the position of each detected object with respect to the traffic lanes of the road, given the equation of each lane separation line and the merged data.

The computer C10 knows the coordinates, in the reference frame $(X_{EGO}, Y_{EGO})$ attached to the EGO vehicle, of a characteristic point of each detected object (hereinafter "anchor point"). This characteristic point is typically the center of the object seen by the front-mounted camera or by the RADAR remote detector. It will be considered here that it is the middle of the grille of the car C1, C2.

In the example of FIG. 1 in which two objects have been detected (the two cars C1, C2), the coordinates of the anchor points are respectively referenced (X_rel1, Y_rel1) and (Xrel2, Y_rel2).

In this FIG. 1, also represented on the ordinate axis of the reference frame ($X_{EGO}$, $Y_{EGO}$) are the following values:

Y_road_NL_1, which is the value of the term yLine of the equation [Math. 1] for the lane separation line NL, at the abscissa point X_rel1, Y_road_NL_2, which is the value of the term yLine of the equation [Math. 1] for the lane separation line NL, at the abscissa point X_rel2, Y_road_L_1, which is the value of the term yLine of the equation [Math. 1] for the lane separation line L, at the abscissa point X_rel1, Y_road_L_2, which is the value of the term yLine of the equation [Math. 1] for the lane separation line L, at the abscissa point X_rel2, Y_road_R_1, which is the value of the term yLine of the equation [Math. 1] for the lane separation line R, at the abscissa point X_rel1, Y_road_R_2, which is the value of the term yLine of the equation [Math. 1] for the lane separation line R, at the abscissa point X_rel2, Y_road_NR_1, which is the value of the term yLine of the equation [Math. 1] for the lane separation line NR, at the abscissa point X_rel1, Y_road_NR_2, which is the value of the term yLine of the equation [Math. 1] for the lane separation line NR, at the abscissa point X_rel2.

Then, by comparing these values with the lateral coordinates Y_rel1, Y_rel2 of the cars C1, C2, it is possible to determine the traffic lane on which each of these two cars is located.

As an example, the lateral coordinate Y_rel1 of the car C1 here lies between the values Y_road_R_1 and Y_road_L_1, which means that this car is located between the lane separation lines L and R.

At this stage, the computer C10 can thus know the traffic lane $V_L$, $V_C$, $V_R$ in which each detected object is located.

The third step aims to determine parameters characterizing the kinematics of each object with respect to the lane separation lines.

Hereinafter in the description of this step, interest will be focused only on one of these objects (the car C1), for reasons of clarity of explanation.

This step comprises a first substep during which the computer C10 determines the position of the object with respect to one of the lane separation lines. The lane separation line considered is preferentially that which separates the central traffic lane from the traffic lane on which the object considered is located.

As a variant, the lane separation line considered could be another line, for example a lane edge line (see FIGS. 2 and 3), notably if no line is detected between the traffic lane of the object and that of the EGO vehicle 10.

The idea is to discretize an interval of this lane separation line a finite number N of points, then to select that which is closest to the object considered. This operation is performed several times by re-discretizing the lane separation line over an interval that is each time reduced and situated on either side of the selected point in order, ultimately, to find a good estimation of the point of the traffic lane which is closest to the object considered.

Figure 2:
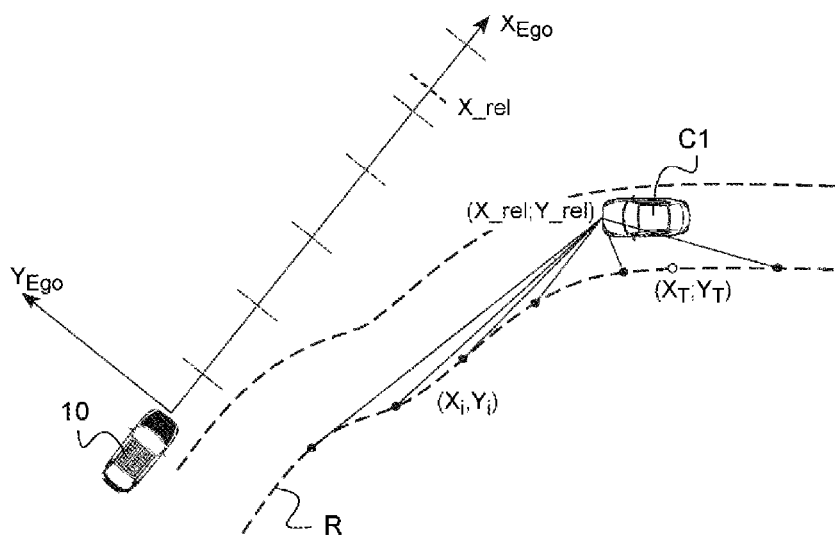
FIG. 2 is a schematic view of the motor vehicle of FIG. 1 and of one of the two target cars.

In practice, as FIG. 2 shows, the computer begins by discretizing the lane separation line R into N points of coordinates ($X_i$, $Y_i$) in the reference frame of the EGO vehicle 10. These points are regularly distributed along this line (in practice, the interval between two consecutive points along the axis $X_{EGO}$ is always the same), a first of the points being situated level with the EGO vehicle (with a zero abscissa) or at a first predetermined distance therefrom, and the last of the points being situated at a second predetermined distance from the EGO vehicle.

Then, knowing the coordinates here denoted ($X_{rel}$; $Y_{rel}$) of the anchor point of the car C1, the computer can deduce therefrom the Euclidian distance $Bird_{Distance}$ between each discretization point of the lane separation line R and the anchor point of the car C1, using the equation:

$$\mathrm{Bird}_{Distance}(X_i, Y_i) = \sqrt{(X_i - X_{rel})^2 + (Y_i - Y_{rel})^2} \qquad \text{[Math. 3]}$$

The discretization point for which the Euclidian distance $Bird_{Distance}$ is the lowest is that which is closest to the car C1. This point of coordinates ($X_S$, $Y_S$) is therefore selected.

Figure 3:
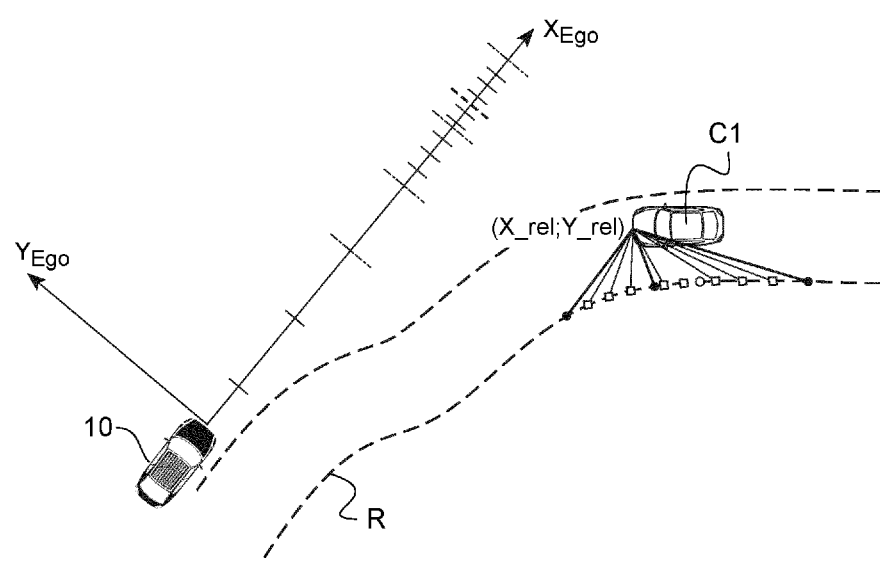
FIG. 3 is a view similar to that illustrated in FIG. 2, illustrating a second step of the process of determining the position of one of the target cars.

Then, as FIG. 3 shows, this discretization operation is repeated over a smaller interval and with a finer discretization. The bounds of the interval are preferably formed by the points of coordinates ($X_{s-1}$, $Y_{s-1}$) and ($X_{s+1}$, $Y_{s+1}$). The number of discretization points is preferably again equal to N. This new operation then makes it possible to select a new point of coordinates ($X_s$, $Y_s$).

After a certain number of loops (for example 10) or when the interval between two discretization points is sufficiently small (for example less than 10 cm), the computer stops repeating these looped operations.

The last point to have been selected is called "projection point F". It is considered that this is a good approximation of the point of the separation line which is closest to the car C1.

The value of the abscissa $X_s$ of this point is called $Distance_{Xproj}$.

The value of the Euclidian distance $Bird_{Distance}$ between the projection point F and the car C1 is called $Dist_{Target2Lane}$.

A second substep consists, for the computer C10, in determining the speed of the EGO vehicle in a reference frame attached to the road and situated level with this EGO vehicle 10, and the speed of the car C1 in a reference frame attached to the road and situated level with that car C1.

In this substep, the hypothesis according to which, from the projection point F, the road follows the tangent at this point will be formulated. It is therefore considered straight from the car C1.

Figure 4:
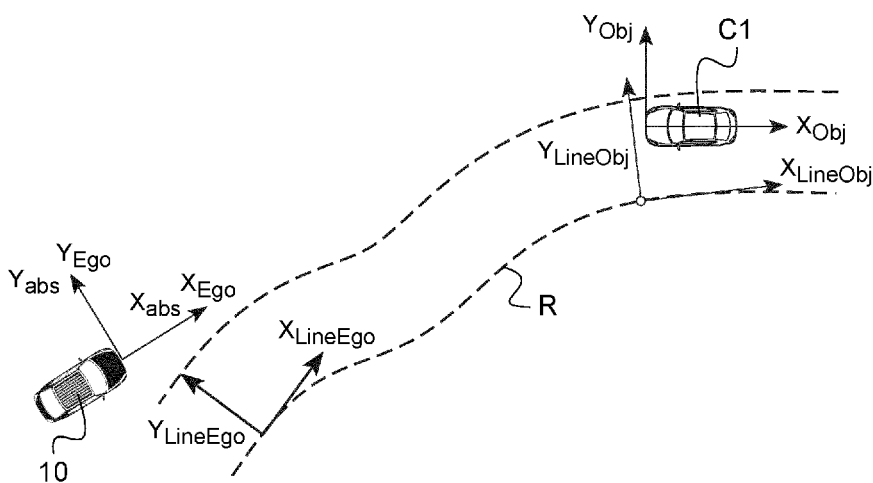
FIG. 4 is a view similar to that illustrated in FIG. 2, illustrating four reference frames used in the context of the invention.

To have a good understanding of the calculations, FIG. 4 shows four reference frames used hereinafter in this explanation.

The first reference frame is the reference frame ($X_{EGO}$, $Y_{EGO}$), already presented, which is attached to the EGO vehicle.

It will be noted that this reference frame advances at the same time as the EGO vehicle 10. Also represented is therefore an absolute reference frame ($X_{abs}$, $Y_{abs}$) which coincides, at the instant of the measurements, with the first reference frame but which is considered fixed.

Another reference frame is denoted ($X_{lineEGO}$, $Y_{lineEGO}$); it is attached to the lane separation line R, is oriented such that its abscissa is tangential to this line, and it is centered at the RADAR of the EGO vehicle (the abscissa of this RADAR is zero in the second reference frame).

Yet another reference frame is denoted $(X_{Obj}, Y_{Obj})$; it is attached to the car C1, is oriented such that its abscissa is aligned with the direction of advance of the car C1, and it is centered at the anchor point of this car C1.

A last reference frame is denoted $(X_{LineObj}, Y_{LineObj})$; it is attached to the lane separation line R, is oriented such that its abscissa is tangential to this line, and it is centered at the anchor point of the car C1.

Figure 5:
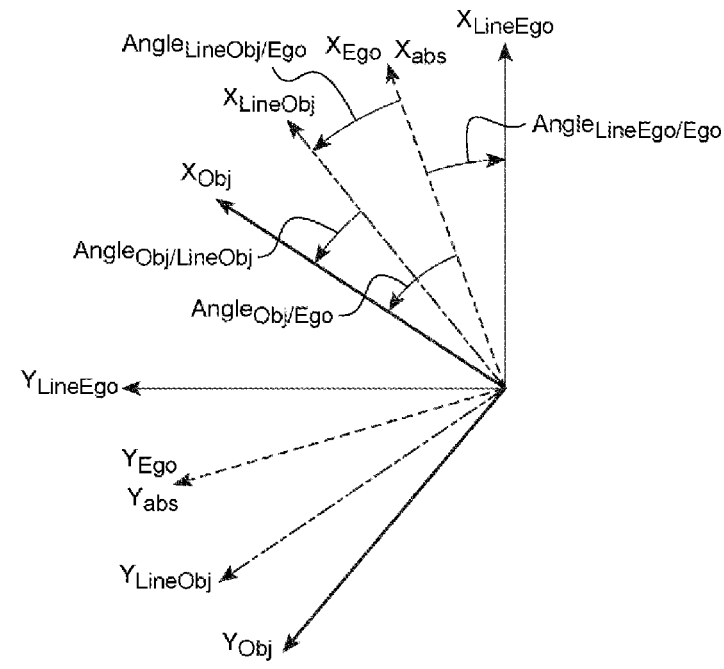
FIG. 5 is a representation of the four reference frames of FIG. 4.

In FIG. 5, the angles separating these reference frames are represented:

Angle$_{lineEGO/EGO}$ makes it possible to switch from the reference frame $(X_{EGO}, Y_{EGO})$ to the reference frame $(X_{lineEGO}, Y_{lineEGO})$, Angle$_{lineObj/EGO}$ makes it possible to switch from the reference frame $(X_{EGO}, Y_{EGO})$ to the reference frame $(X_{LineObj}, Y_{LineObj})$, Angle$_{Obj/EGO}$ makes it possible to switch from the reference frame $(X_{EGO}, Y_{EGO})$ to the reference frame $(X_{Obj}, Y_{Obj})$ Angle$_{Obj/LineObj}$ makes it possible to switch from the reference frame $(X_{LineObj}, Y_{LineObj})$ to the reference frame $(X_{Obj}, Y_{Obj})$.

The term Angle$_{LineX/EGO}$ will be used more generally to denote the angle separating the abscissa of the reference frame $(X_{EGO}, Y_{EGO})$ and the tangent to the lane separation line R, at the abscissa point X (expressed in the reference frame $(X_{EGO}, Y_{EGO})$).

It is then possible to write:

$$\text{Angle}_{LineX/Ego} = \arctan(d(yLine(x))/dx) \qquad \text{[Math. 4]}$$

With:

$$\frac{d(yLine(x))}{dx} = 3.d.x^2 + 2.c.x + b \qquad \text{[Math. 5]}$$

Then, for x=0, it is possible to write:

$$\text{Angle}_{LineX/Ego} = \text{Angle}_{LineEgo/Ego} = \arctan(b) \qquad \text{[Math. 6]}$$

At the abscissa point x=Distance$_{Xproj}$, it is possible to write:

$$\text{Angle}_{Obj/LineObj} = \text{Angle}_{Obj/Ego} - \text{Angle}_{LineObj/Ego} \qquad \text{[Math. 7]}$$

The computer can calculate the longitudinal $Vx_{EGO/LineEGO}$ and lateral $Vy_{EGO/LineEGO}$ components of the speed of the EGO vehicle 10 in the reference frame $(X_{LineEGO}, Y_{LineEGO})$ by means of the following formulae:

$$Vx_{Ego/LineEgo} = V_{Ego/abs} * \cos\left(\text{Angle}_{V_{Ego/Ego}} - \text{Angle}_{LineEgo/Ego}\right) \qquad \text{[Math. 8]}$$

$$Vy_{Ego/LineEgo} = V_{Ego/abs} * \sin\left(\text{Angle}_{V_{Ego/Ego}} - \text{Angle}_{LineEgo/Ego}\right) \qquad \text{[Math. 9]}$$

In these formulae:

$V_{EGO/abs}$ is the speed of the EGO vehicle 10 in the absolute reference frame $(X_{abs}, Y_{abs})$, measured for example by the sensors situated at the axles of the vehicles;

Angle$_{VEgo/Ego}$ is the angle of the speed vector of the EGO vehicle 10 with respect to the abscissa of the reference frame $(X_{EGO}, Y_{EGO})$. This angle is here assumed zero.

The computer can also calculate the longitudinal $Vx_{Obj/abs}$ and lateral $Vy_{Obj/abs}$ components of the speed $V_{Obj/abs}$ of the car C1 in the absolute reference frame. For that it uses the following formulae:

$$Vx_{Obj/abs} = Vx_{Obj/Ego} + Vx_{Ego/abs} \qquad \text{[Math. 10]}$$

$$Vy_{Obj/abs} = Vy_{Obj/Ego} + Vy_{Ego/abs} \qquad \text{[Math. 11]}$$

In these formulae:

$Vx_{EGO/abs}$ and $Vy_{EGO}$/abs are the components of the speed of the EGO vehicle 10 along the abscissa and the ordinate of the absolute reference frame $(X_{abs}, Y_{abs})$, and $Vx_{Obj/EGO}$ and $Vy_{Obj/EGO}$ are the components of the speed of the car C1 with respect to the EGO vehicle 10 along the abscissa and the ordinate of the reference frame $(X_{EGO}, Y_{EGO})$.

It is then possible to write:

$$V_{obj/abs} = \sqrt{Vx_{Obj/abs}^2 + Vy_{Obj/abs}^2} \qquad \text{[Math. 12]}$$

As the following two equations show, it is possible, from the angles Angle$_{LineObj/Ego}$ and Angle$_{LineEgo/Ego}$, to determine the components $Vx_{Obj/lineObj}$, $Vy_{Obj/lineObj}$ of the relative speed "following the lane separation line R" of the car C1 with respect to this line at the projection point F, which allows the information to be represented better.

$$Vx_{Obj/LineObj} = \qquad \text{[Math. 13]}$$
$$V_{obj/abs} * \cos\left(\text{Angle}_{V_{Obj/Obj}} + \text{Angle}_{Obj/Ego} - \text{Angle}_{LineObj/Ego}\right)$$

$$Vy_{Obj/LineObj} = \qquad \text{[Math. 14]}$$
$$V_{obj/abs} * \sin\left(\text{Angle}_{V_{Obj/Obj}} + \text{Angle}_{Obj/Ego} - \text{Angle}_{LineObj/Ego}\right)$$

In these two equations, Angle$_{VObj/Obj}$ is the angle of the speed vector of the car C1 in the reference frame attached to that car, and Angle$_{Obj/Ego}$ is the heading angle of the car in the reference frame $(X_{EGO}, Y_{EGO})$.

In practice, it is assumed here that the speed vector of the object is colinear with its heading angle, such that the angle Angle$_{VObj/Obj}$ is zero.

A similar process is applied to determine the relative accelerations "following the lane separation line R" between the EGO vehicle and that line at the zero abscissa point and between the car C1 and that line at the projection point F.

Thus, the computer can calculate the longitudinal $Ax_{EGO/LineEGO}$ and lateral $Ay_{EGO/LineEGO}$ components of the acceleration of the EGO vehicle 10 in the reference frame $(X_{LineEGO}, y_{LineEGO})$ by means of the following formulae:

$$Ax_{Ego/LineEgo} = A_{Ego/abs} * \cos\left(\text{Angle}_{V_{Ego/Ego}} - \text{Angle}_{LineEgo/Ego}\right) \qquad \text{[Math. 15]}$$

$$Ay_{Ego/LineEgo} = A_{Ego/abs} * \sin\left(\text{Angle}_{V_{Ego/Ego}} - \text{Angle}_{LineEgo/Ego}\right) \qquad \text{[Math. 16]}$$

The computer can also calculate the longitudinal $Ax_{Obj/LineObj}$ and lateral $Ay_{Obj/LineObj}$ components of the acceleration of the car C1 in the reference frame $(X_{LineObj}, Y_{LineObj})$ by means of the following formulae:

11                                                                           12

Here, it calculates this distance by means of the following equation:

$$Ax_{Obj/LineObj} = \qquad\qquad\qquad\qquad\qquad\qquad [\text{Math. 17}]$$

$$A_{obj/abs} * \cos(Angle_{V_{Obj}/Obj} + Angle_{Obj/Ego} - Angle_{LineObj/Ego})$$

$$Ay_{Obj/LineObj} = \qquad\qquad\qquad\qquad\qquad\qquad [\text{Math. 18}]$$

$$A_{obj/abs} * \sin(Angle_{V_{Obj}/Obj} + Angle_{Obj/Ego} - Angle_{LineObj/Ego})$$

$$Lane_{DY} = Dist_{Target2Lane} - \qquad\qquad\qquad [\text{Math. 23}]$$

$$sign(Dist_{Target2Lane}).\frac{Width}{2}abs(\cos(Angle_{Obj/LineObj}))$$

In these formulae:

$A_{EGO/abs}$ is the absolute acceleration of the EGO vehicle 10 in the absolute reference frame;

$A_{Obj/abs}$ is the absolute acceleration of the car C1 in the absolute reference frame.

The calculated speeds and the calculated accelerations can then be combined in order to obtain the longitudinal components $VRelRoute_{Longi}$, $ARelRoute_{Longi}$ and lateral components $VRelRoute_{Lat}$, $ARelRoute_{Lat}$ of the relative speed and of the relative acceleration of the EGO vehicle and of the car C1, relative to the road taken, using the four equations defined hereinbelow.

In practice, it is considered that the longitudinal component $VRelRoute_{Longi}$ of the relative speed between the EGO vehicle and the car C1 is equal to the deviation between, on the one hand, the longitudinal component of the speed of the EGO vehicle expressed in the reference frame ($X_{LineEGO}$, $Y_{LineEGO}$) attached to the traffic lane at the EGO vehicle, and, on the other hand, the longitudinal component of the speed of the car C1 expressed in the reference frame ($X_{LineObj}$, $Y_{LineObj}$) attached to the traffic lane at the car C1.

Similarly, it is considered that the lateral component $VRelRoute_{Lat}$ of the relative speed between the EGO vehicle and the car C1 is equal to the deviation between, on the one hand, the lateral component of the speed of the EGO vehicle expressed in the reference frame ($X_{LineEGO}$, $Y_{LineEGO}$) attached to the traffic lane at the EGO vehicle, and, on the other hand, the lateral component of the speed of the car C1 expressed in the reference frame ($X_{LineObj}$, $Y_{LineObj}$) attached to the traffic lane at the car C1.

It is therefore possible to write:

$$VRelRoute_{Longi} = Vx_{Obj/LineObj} - Vx_{Ego/LineEgo} \quad [\text{Math. 19}]$$

$$VRelRoute_{Lat} = Vy_{Obj/LineObj} - Vy_{Ego/LineEgo} \quad [\text{Math. 20}]$$

The components of the acceleration can be calculated in a similar way:

$$ARelRoute_{Longi} = Ax_{Obj/LineObj} - Ax_{Ego/LineEgo} \quad [\text{Math. 21}]$$

$$ARelRoute_{Lat} = Ay_{Obj/LineObj} - Ay_{Ego/LineEgo} \quad [\text{Math. 22}]$$

As will appear in detail hereinafter in this explanation, the use of the relative speeds makes it possible to provide indications on the risks of collision which would be difficult to obtain otherwise.

At this stage it can be recalled that the computer C10 knows the value of the distance $Dist_{Target2Lane}$ between the lane separation line (at the projection point F) and the anchor point of the car C1.

Figure 6:
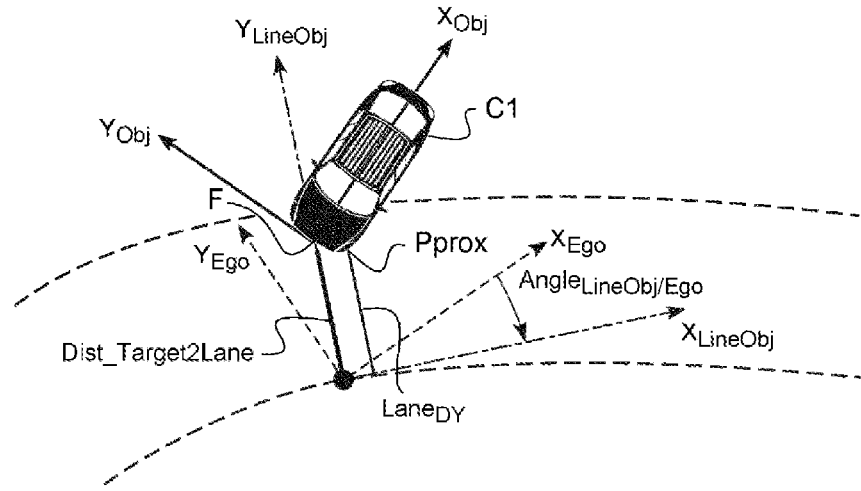
FIG. 6 is a schematic view of one of the target cars of FIG. 1 and of its traffic lane.

During a third substep, the computer C10 determines the distance $Lane_{DY}$ between the projection point F and the point $P_{prox}$ of the car C1 closest to the lane separation line R (see FIG. 6).

In this equation, the term Width corresponding to the width of the car C1.

The set of calculations then makes it possible to determine, during a fourth substep, a time to collision TTC with the object considered (the car C1), that is to say the time necessary for the EGO vehicle to strike the car C1 if the latter maintain their speeds.

Indeed, at this stage, the computer knows, from the equation [Math. 2], the length $L_{AB}$ of the arc separating the EGO vehicle 10 from the car C1. It also knows, from the equation [Math. 19], the longitudinal component $VRelRoute_{Longi}$ of the relative speed between the EGO vehicle 10 and the car C1 related to the form of the road. Finally, it knows, from the equation [Math. 21], the longitudinal component $ARelRoute_{Longi}$ of the corresponding acceleration.

The use of these longitudinal components makes it possible, when the road is curved and the vehicles do not have parallel paths, to obtain a good approximation of the time to collision TTC.

Here, the computer C10 then determines the time to collision TTC sought using the following equation:

$$TTC = \qquad\qquad\qquad\qquad\qquad\qquad [\text{Math. 24}]$$

$$\frac{-VRelRoute_{Longi} + \sqrt{VRelRoute_{Longi}^2 + 2*ARelRoute_{Longi}*L_{AB}}}{ARelRoute_{Longi}}$$

It will be noted that two conditions of validity of this equation must first be verified. These conditions are as follows.

$$VRelRoute_{Longi}^2 + 2*ARelRoute_{Longi}*L_{AB} \geq 0 \text{ and} \quad [\text{Math. 25}]$$

$$ARelRoute_{Longi} \neq 0$$

On the other hand, if the longitudinal component $ARelRoute_{Longi}$ of the relative acceleration is zero, it is possible to write:

$$TTC = \frac{L_{AB}}{VRelRoute_{Longi}} \qquad\qquad\qquad [\text{Math. 26}]$$

To sum up, at this stage, the computer has available, by virtue of the use of the merged data, different parameters characterizing the different objects located in its environment and which are as many potential obstacles located on its path. Notably, it has available for each object:

the time to collision TTC (equation [Math. 24]), the position of the object on the road (determined during the step 2), and information confirming the existence of the object (supplied in the data merging step).

Then, during a fourth step, the computer C10 performs a first filtering of the different detected objects as a function of the parameters that it has available so as to consider only those which are relevant for the implementation of the AES function (that is to say those which form potential obstacles).

The filtering operation thus consists in considering that the relevant objects (hereinafter called "targets") are those whose existence has been valid in the merging of data, the position of which is potentially hazardous (in this example, that amounts to verifying that the objects are located on one of the traffic lanes) and for which the time to collision TTC is below a predetermined threshold.

If several targets are detected on a same traffic lane, it is also possible to consider a restricted number of them (for example 4), namely those for which the distances to the EGO vehicle 10 are the lowest.

The fifth step consists, for the computer C10, in identifying, for each of these targets, a deviation (or "overlap") that is necessary to avoid this target by the right and by the left if the latter were to maintain its path relative to the road.

Figures 7, 8:
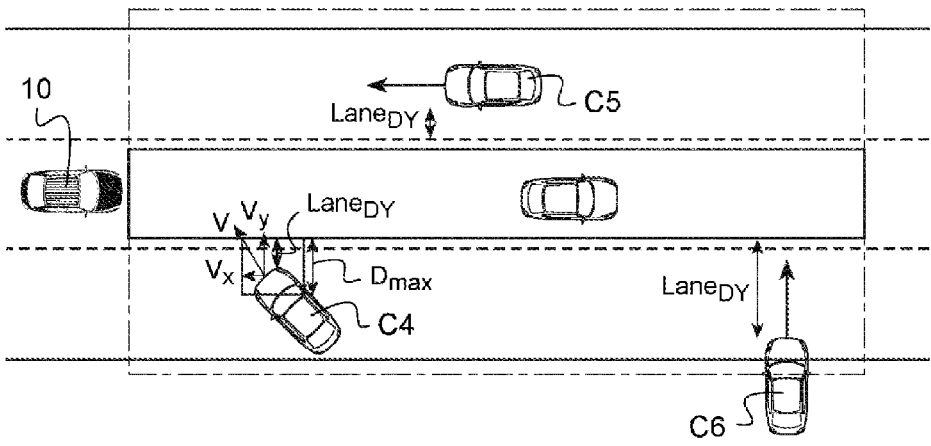
FIG. 7 is a schematic view of an example of configuration involving the motor vehicle according to the invention and three cars traveling in proximity.
FIG. 8 is a schematic view of another example of configuration involving the motor vehicle according to the invention and three cars traveling in proximity.

In FIG. 7, an example of three targets has been represented for which the deviations are defined in the following table:

TABLE 1

| Target | $E_{left}$ | $E_{right}$ |
|--------|-----------|------------|
| $C_1$ | 3.5 | 1.5 |
| $C_2$ | 4 | 1 |
| $C_3$ | 0.5 | 4.5 |

The determination of these right $E_{left}$ and left $E_{right}$ deviations is performed given the path of the EGO vehicle 10 and the merged data. It can be seen in FIG. 7 that each target is bracketed by a rectangle, which can correspond to a safety zone that is larger than the target inside which the EGO vehicle 10 is not wanted to enter.

The example of FIG. 7 corresponds to a case in which the EGO vehicle and the targets are moving in a straight line.

In the case where the road is not straight, it is proposed to refine the calculations by taking account of the following information:

the lateral component $VRelRoute_{Lat}$ of the relative speed between the EGO vehicle and the target considered, along the road taken (equation [Math. 20]), the angle $Angle_{Obj/LineObj}$, and the time to collision TTC.

The first of these makes it possible to take account of the real lateral speed between the EGO vehicle 10 and the target, given the form of the traffic lane.

In order to have a good understanding of the benefit of this parameter, an example can be considered in which the EGO vehicle and the target are traveling on two distinct traffic lanes, in opposite directions, keeping well to the curvatures of these two traffic lanes. It is then understood that, in theory, the risks of accident are zero. In this example, the lateral component $VRelRoute_{Lat}$ of the relative speed of the EGO vehicle with respect to the target will be zero, so that the calculated deviation will be zero, which clearly expresses the idea of a theoretically zero risk of collision.

In other words, the lateral component $VRelRoute_{Lat}$ and the time to collision TTC make it possible to weight the influence of the relative lateral and longitudinal speeds on the calculation of the right and left deviations $E_{right}$, $E_{left}$.

Likewise, the $Angle_{Obj/LineObj}$ information makes it possible to determine a more precise value of the impact surface of the target considered, by weighting the length and width of the vehicle.

The calculation of these right and left deviations $E_{right}$, $E_{left}$ is performed here in a way similar to that described in the document FR1907351, except that these calculations make it possible to take account of the abovementioned three types of information.

Thus, the calculation of the half-width of the target will be performed as a function of the $Angle_{Obj/LineObj}$ information. This half-width is then used to calculate a preliminary value for each deviation, which does not take account of a safety radius to avoid the target. The lateral component $VRelRoute_{Lat}$ is, for its part, multiplied by the time to collision TTC to then be added to this preliminary deviation in order to obtain the desired deviations.

In other words, if the document FR1907351 is considered, to calculate the deviations, it will be necessary to use, in the calculation of the lateral coordinate dVy, the product of the lateral component $VRelRoute_{Lat}$ with the time to collision TTC. The coordinate $Y_a$ used (which corresponds here to the coordinate $Y_{rel}$) will, for its part, be considered equal to the sum of the coordinate resulting from the merging of data and a term equal to the product of the length of the target by the cosine of the angle $Angle_{Obj/LineObj}$.

Thus, it is then possible to write:

$$E_{left} = Y_a + er + Long.\cos\left(Angle_{Obj_{LineObj}}\right) + VRelRoute_{Lat}.TTC \quad \text{[Math. 27]}$$

In this equation, er is a term making it possible to compensate for lateral measurement errors, and Long is the length of the target.

$$E_{right} = Y_a + er - Long.\cos\left(Angle_{Obj_{LineObj}}\right) + VRelRoute_{Lat}.TTC \quad \text{[Math. 28]}$$

In the case in which the merging of data is used, the term er also takes account of the error originating from the merging of data. This term is predetermined and stored in a memory of the computer.

The sixth step consists, for the computer, in performing a second filtering from among the targets, to distinguish those which are critical from the others.

A target will be qualified as critical if it requires the activation of the AES function to be avoided. The most critical target (MCT target) is that requiring the activation of the AES function earliest.

A target will be qualified as "moderately risky" if its position is such that it must be taken into account in determining the avoidance path to be followed. Thus, a moderately risky target is likely to prevent the activation of the AES function.

The idea is to consider in succession each detected target independently (and therefore independently of its environment).

To begin, the computer C10 considers that all the targets situated on the traffic lane of the EGO vehicle 10 are critical.

Regarding the targets located on the lanes adjacent to that taken by the EGO vehicle 10, the computer checks to see if they observe additional criteria.

Here, these criteria are linked to the following parameters:

the arc distance $L_{AB}$, the distance $Lane_{DY}$ between the projection point F and the point of the target which is closest to the lane separation line (equation [Math. 23]), and the lateral component $Vy_{Obj/lineObj}$ of the speed of the target with respect to the lane separation line at the projection point F (equation [Math. 14]).

In FIG. 8, three targets C4, C5, C6 are represented which are located on two lanes adjacent to that taken by the EGO vehicle 10.

To determine whether each target is critical or not, the computer checks to see if the following two conditions i) and ii) are met.

To check the first condition i), the computer begins by calculating the distance $Lane_{DY}$ between the target and the lane separation line considered (equation [Math. 23]). That makes it possible to know if the target is rather close to or, on the contrary, away from the lane separation line considered.

The computer C10 deduces therefrom a minimum lateral speed threshold, denoted $Vy_{seuilMin}$.

Then, if the component $Vy_{Obj/lineObj}$ exceeds the minimum threshold $Vy_{seuilMin}$, then the first condition (for considering the target as critical) is confirmed. Otherwise, the target is simply considered as being moderately risky.

It will be noted that the threshold used is therefore a variable which is a function of the distance between the target and the lane separation line considered, which makes it possible to take account of the fact that as this distance becomes shorter, the more great the risk of collision becomes.

The threshold used will also be able to depend on the manner in which the target was characterized in the preceding time step (critical or non-critical). The idea is in fact that the characterization of the target does not vary on each time step, because of noises in the measurements of the data to be merged. For that, the threshold used for the target to switch from non-critical to critical is higher than that used for the target to switch from critical to non-critical (in the manner of a hysteresis function).

This condition i) can then be formulated otherwise. Thus, in the example of FIG. 8, it is then possible to choose to define a virtual lane separation line which is substantially parallel to the lane separation line considered, but away from the latter, on the side of the traffic lane of the EGO vehicle.

The deviation is then chosen as a function of a "Time-ToCross" parameter multiplied by the lateral speed considered. With for example a "TimeToCross" parameter of 1 second, if the lateral speed considered is 1.2 m/s, a deviation of 1.2 m is obtained. Then, the crossing of this line corresponds to a confirmation of the condition i).

It will be noted that the form of this virtual line can be parallel to the reference lane separation line or be parallel thereto only from the target to mid-distance with the EGO vehicle, then widen slowly towards the EGO vehicle in order to approach the reference line.

The second condition ii) makes it possible to not take account of the targets deriving from possible perception errors, as well as those having excessively great or aberrant lateral speeds. For that, the computer compares the absolute value of the lateral component $Vy_{Obj/lineObj}$ with a predetermined maximum threshold $Vy_{seuilMax}$. If this component is above the maximum threshold, the second condition is not confirmed and the target is considered as being moderately risky. The maximum threshold must be restrictive so as not to consider false detections which sometimes have excessive values.

This maximum threshold is preferably greater than 2 m/s, preferentially equal to 3 m/s.

The targets which do not fulfil one and/or the other of the conditions i) and ii) are considered as moderately risky targets. The other targets are considered to be critical.

The classification of the perceived targets as critical targets and as moderately risky targets makes it possible to reduce the computation times. Furthermore, this classification of the targets simplifies the decision of whether or not to activate the AES system, and the decision taken can be justified to a human driver.

In FIG. 8, it can be considered that only the target C4 fulfils the two conditions i) and ii), since neither of the other two targets fulfils the condition i).

The seventh step consists, for the computer C10, in determining, for each critical target, a critical time Tcrit which incorporates two distinct and relevant kinds of information to guarantee an obstacle avoidance by minimizing the intrusive nature of the AES function for the driver.

The benefit of calculating this parameter is notably to make it possible to find which is the most critical target MCT out of the critical targets.

Before describing how this parameter is obtained, it will be able to be recalled that the AES avoidance system can be operated entirely automatically (in which case the avoidance path is followed by the assisted steering actuator, autonomously) or semi-automatically (in which case the avoidance is performed manually by the driver, the assisted steering actuator being controlled to assist the driver in following an avoidance path once the driver has triggered the avoidance). Hereinafter in the description, an autonomous mode and a manual mode will be used to respectively designate these two methods.

The avoidance in manual mode is potentially less effective than the avoidance in autonomous mode. Thus, the avoidance path calculated by the AES system will not be the same in manual mode and in autonomous mode. It will be noted that the calculation of this avoidance path (in clothoid form) is not the subject of the present invention. Simply recall that the form of this path is calculated as a function of the dynamic performance levels of the vehicle and the capabilities of the driver (in manual mode).

Whatever the case, given the calculated deviations $E_{right}$, $E_{left}$, it is possible to construct four avoidance paths (four clothoids) to avoid the critical target by the right and by the left, in manual mode and in autonomous mode.

These clothoids have curvatures which depend on the maximum dynamic capabilities of the vehicle. The form of these clothoids is then read in a database, as a function of the speed of the EGO vehicle 10.

Given these determined deviations and avoidance paths, it is possible to deduce therefrom four TTS maneuvering times (see FIG. 7) which correspond to the time required, in each mode, to perform the avoidance maneuver by the left or by the right.

The way in which these TTS maneuvering times are obtained will not be described here since it will depend on the dynamic characteristics of the EGO motor vehicle 10 and on the performance levels of the driver. In practice, these TTS maneuvering times could be read in a database established using a battery of tests.

Knowing the time to collision TTC and the TTS maneuvering time for each critical target, the computer can deduce therefrom the critical time Tcrit using the formula $$Tcrit = TTC - TTS \qquad \text{[Math. 29]}$$

This critical time therefore becomes zero at the last moment at which it is still possible to activate the AES function and avoid the collision with the critical target considered, in the manual or automatic mode considered, by avoiding it by the side considered.

Thus, this critical time Tcrit has three vital kinds of information on the target considered: the side by which to avoid it, the performance of the system (and of the driver) and the time to collision TTC with the target.

The eighth step then considers using the critical times Tcrit calculated to classify the critical targets and find the most critical target MCT.

In the case where the driver is master of the maneuver in manual mode (for example because the autonomous mode has not been able to be activated), the computer selects the critical target for which the critical time is the lowest in case of avoidance by the right and that for which the critical time is the lowest in case of avoidance by the left.

Then, as soon as the computer C10 detects that the driver initiates an avoidance maneuver, it can decide to activate the AES system to assist the driver in his or her maneuver as a function of the two critical times selected.

For that, the computer determines the side to which the driver turns the steering wheel when he or she begins his or her avoidance maneuver (by the right or by the left), then it elects, out of the two selected critical times, that which corresponds to the side by which the driver begins his or her avoidance maneuver.

The most critical target MCT is that which corresponds to this elected critical time.

In autonomous mode, the computer proceeds otherwise. It is in fact necessary to determine the side by which the EGO vehicle 10 must avoid the obstacle or obstacles.

The idea is then to determine, for each critical target, the best side to avoid then to next determine the most critical target MCT.

To have a good understanding of how the computer proceeds, reference can be made to FIG. 7.

In this example, the values of the abovementioned parameters have been calculated, which makes it possible to construct the following table:

TABLE 2

| Target | $E_{left}$ | $E_{right}$ | TTS/ left | TTS/ right | TTC | Tcrit/ left | Tcrit/ right |
|--------|-----------|------------|-----------|-----------|-----|------------|-------------|
| $C_1$ | 3.5 | 1.5 | 4 | 2 | 2.7 | −1.3 | 0.7 |
| $C_2$ | 4 | 1 | 4.3 | 1.7 | 3.2 | −1.1 | 1.5 |
| $C_3$ | 0.5 | 4.5 | 1 | 4.6 | 1.5 | 0.5 | −3.1 |

It will be observed that the target C3 is avoidable only by the left and that the others are avoidable only by the right.

In practice, the computer selects, for each critical target, the side for which the critical time Tcrit is the highest.

Then it elects, from among the duly selected critical times, that which is the lowest.

Then, the computer considers that the most critical target MCT is that for which the critical time Tcrit has been elected. Here it is the target $C_3$.

The ninth step consists, for the computer C10, in triggering the AES function if that is necessary and at the optimal moment.

In this particular case, in autonomous mode, the AES function is triggered as soon as the elected critical time Tcrit goes below a predetermined threshold, for example equal to 0 second.

On the other hand, in manual mode, the triggering of this AES function is applied differently.

The idea is to trigger the AES function and the accompanying of the driver in the avoidance in a manner suited to the situation.

Indeed, if the driver initiates his or her steering wheel move too early, his or her maneuver will be considered as non-urgent because the situation does not require an action from the driver of this type at this moment. The AES system will not then be activated.

Likewise, if a collision is imminent and if the autonomous mode has not been able to be activated beforehand, then it will be possible to consider that it will be too late for the AES system to be able to provide any assistance to the driver. It will then be left to the care of another safety system to minimize the impact.

Thus, in manual mode, it will be necessary to determine a time interval during which, if an avoidance action performed by the driver is detected, the AES system will be activated.

This time interval will be delimited by two bounds.

The first bound, from which, if the driver initiates an avoidance maneuver, he or she will be assisted, will correspond to a critical time Tcrit strictly greater than 0.

The second bound, from which it will be considered that it is too late to trigger the AES system, corresponds to a critical time Tcrit less than or equal to 0, and preferably strictly less than 0.

Thus, to activate the AES function, the computer determines whether the critical time Tcrit elected lies between these two bounds, and it activates the AES function only if such is the case.

The present invention is in no way limited to the embodiment described and represented; instead, the person skilled in the art will be able to add any variant to it that conforms to the invention.

The invention claimed is:

1. A method for triggering an obstacle avoidance system for a motor vehicle running on a road, comprising:

detecting at least one object situated in an environment of the motor vehicle and acquiring data relating to the detected said at least one object, determining, for said at least one object, a parameter relating to a time remaining before the motor vehicle can strike said at least one object, as a function of the acquired data, determining at least one path deviation to be performed to avoid said at least one object, and activating the obstacle avoidance system to avoid said at least one object according to values of said parameter and each of at least one path deviation, wherein said determining at least one path deviation comprises:

calculating a relative lateral speed as a function of the at least one path deviation between a lateral speed of the motor vehicle with respect to the road in a first reference frame oriented according to a tangent to the road at the motor vehicle and a lateral speed of said at least one object with respect to the road in a second reference frame oriented according to a tangent to the road at said at least one object, and determining each of at least one path deviation as a function of the relative lateral speed, a function of said parameter, and as a function of an angle formed between a speed vector of the object and the tangent to the road at said at least one object.

2. The triggering method as claimed in claim 1, wherein the determining said parameter comprises:

calculating an arc distance between the motor vehicle and said at least one object, calculating a relative longitudinal speed as a function of the at least one path deviation between the longitudinal speed of the motor vehicle with respect to the road in the first reference frame and the longitudinal speed of said at least one object with respect to the road in the second reference frame, calculating a relative longitudinal acceleration as a function of the at least one path deviation between the relative longitudinal acceleration of the motor vehicle with respect to the road in the first reference frame and the relative longitudinal acceleration of said at least one object with respect to the road in the second reference frame, and determining said parameter as a function of the relative longitudinal speed of the relative longitudinal acceleration and of the arc distance.

3. A method for triggering an obstacle avoidance system for a motor vehicle running on a road, comprising:

detecting at least one object situated in an environment of the motor vehicle and acquiring data relating to the detected said at least one object, determining, for said at least one object, a parameter relating to a time remaining before the motor vehicle can strike said at least one object, as a function of the acquired data, determining at least one path deviation to be performed to avoid said at least one object, and activating the obstacle avoidance system to avoid said at least one object according to values of said parameter and each of at least one path deviation, wherein said determining at least one path deviation comprises:

calculating a relative lateral speed as a function of the at least one path deviation between a lateral speed of the motor vehicle with respect to the road in a first reference frame oriented according to a tangent to the road at the motor vehicle and a lateral speed of said at least one object with respect to the road in a second reference frame oriented according to a tangent to the road at said at least one object, and determining each of at least one path deviation as a function of the relative lateral speed, the triggering method further comprising:

calculating a maneuvering time necessary to avoid said at least one object as a function of said path deviation, wherein the activating the obstacle avoidance system is performed according to said maneuvering time.

4. The triggering method as claimed in claim 3, further comprising:

calculating a critical time relative to a time remaining to avoid said at least one object in total safety as a function of the maneuvering time and of said parameter, wherein the activating the obstacle avoidance system is performed according to said critical time.

5. The triggering method as claimed in claim 4, wherein, to activate the obstacle avoidance system such that the obstacle avoidance system performs avoidance without intervention from a driver of the motor vehicle when several objects have been detected, provision is made to:

calculate, for each of said at least one object, a critical time to avoid said at least one object by a first side of said at least one object and a critical time to avoid said at least one object by a second side of said at least one object that is opposite to the first side, select, for each of said at least one object, the greater of the two calculated critical times, then elect the lowest critical time from among the selected critical times, and wherein the activating the avoidance system is performed according to said elected lowest critical time.

6. The triggering method as claimed in claim 4, wherein, to activate the obstacle avoidance system such that the obstacle avoidance system performs an avoidance given action from a driver of the motor vehicle on the steering wheel when several objects have been detected, provision is made to:

calculate, for each of said at least one object, a critical time to avoid said at least one object by a first side of said at least one object and a critical time to avoid said object by a second side of said at least one object that is opposite to the first side, select the smaller of the calculated critical times to perform the avoidance by the first side, select the smallest of the calculated critical times to perform the avoidance by the second side, and wherein the activating the obstacle avoidance system is performed as a function of a moment at which the driver of the motor vehicle initiates an avoidance and as a function of a one of the two selected critical times that is associated with an avoidance by the side to which the driver of the motor vehicle initiates the avoidance.

7. The triggering method as claimed in claim 4, further comprising:

filtering detected objects, said filtering comprising:

determining a distance between each of said at least one object and a lane separation line, selecting the detected objects for which the lateral relative speed is greater than a threshold deduced from said distance, and implementing the calculating the critical time only for the selected detected objects.

8. The triggering method as claimed in claim 1, further comprising:

filtering detected objects, said filtering comprising:

determining positions of the detected objects with respect to road traffic lanes, selecting the detected objects situated on the road traffic lanes and for which the parameter is less than a predetermined threshold, and implementing the calculating the critical time only for the selected detected objects.

9. A motor vehicle comprising:

at least one drive wheel, a steering system for each drive wheel configured to be maneuvered by an actuator controlled by a computer, wherein the computer is configured to, detect at least one object situated in an environment of the motor vehicle and acquire data relating to the detected said at least one object, determine, for said at least one object, a parameter relating to a time remaining before the motor vehicle can strike said at least one object, as a function of the acquired data, determine at least one path deviation to be performed to avoid said at least one object, and activate an obstacle avoidance system to avoid said at least one object according to values of said parameter and each of at least one path deviation, wherein said at least one path deviation is determined by:

calculating a relative lateral speed as a function of the at least one path deviation between a lateral speed of the motor vehicle with respect to the road in a first reference frame oriented according to a tangent to the road at the motor vehicle and a lateral speed of said at least one object with respect to the road in a second reference frame oriented according to a tangent to the road at said at least one object, and determining each of at least one path deviation as a function of the relative lateral speed, a function of said parameter, and as a function of an angle formed between a speed vector of the object and the tangent to the road at said at least one object.

* * * * *